Sept. 14, 1926.
F. T. HAGUE
1,599,523
COMMUTATOR CONTROL OF BOOSTER ROTARY CONVERTERS
Filed March 10, 1923
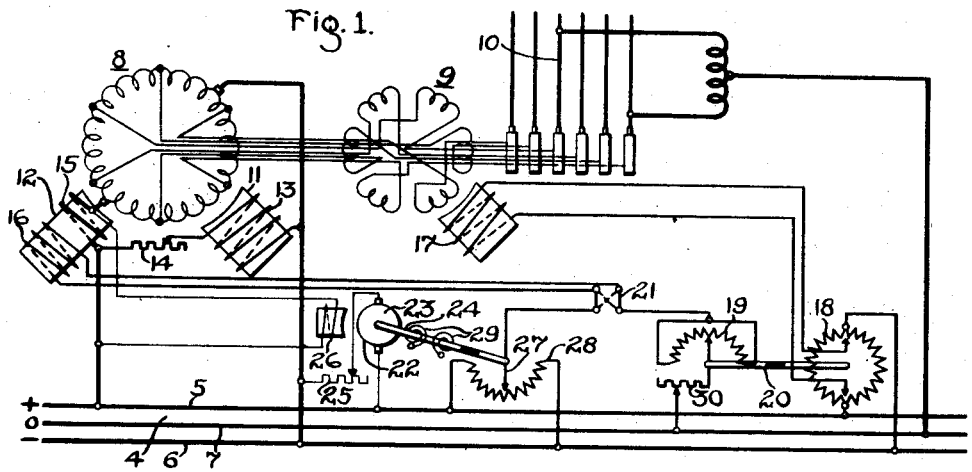
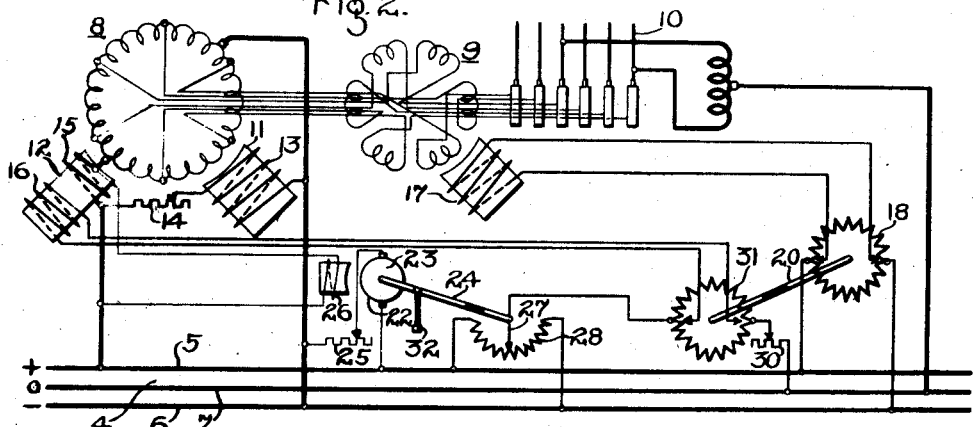
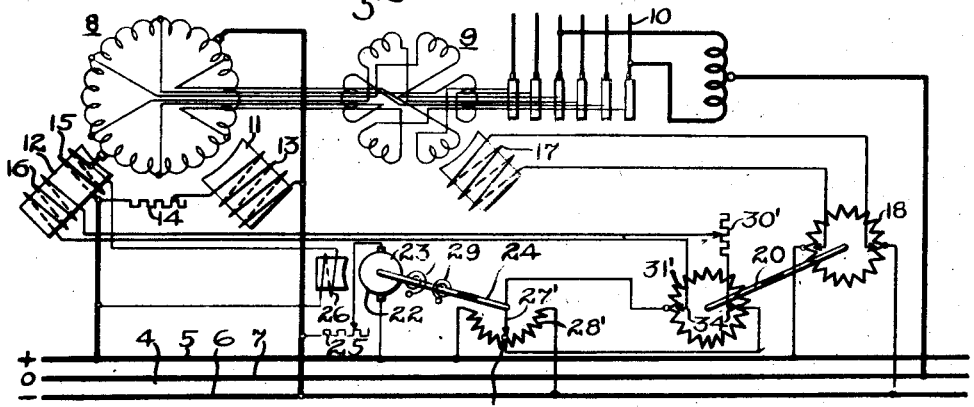
WITNESSES:
R. J. Butler
O. B. Buchanan
INVENTOR
Floyd T. Hague.
BY
Wesley G. Carr
ATTORNEY Patented Sept. 14, 1926.

1,599,523

UNITED STATES PATENT OFFICE.

FLOYD T. HAGUE, OF PITTSBURGH, PENNSYLVANIA, ASSIGNOR TO WESTINGHOUSE ELECTRIC & MANUFACTURING COMPANY, A CORPORATION OF PENNSYLVANIA.

COMMUTATOR CONTROL OF BOOSTER ROTARY CONVERTERS.

Application filed March 10, 1923. Serial No. 624,150.

My invention relates, in general, to methods of, and means for, controlling the commutation of direct-current machines, with particular relation to synchronous booster converters.

The development of large 25-cycle Edison systems, or three-wire systems fed by rotary converters from a 25-cycle supply line, has necessitated the use of two or more non-interconnected alternating current power supply systems for the supply of a plurality of converters which feed into a common direct-current network. The introduction of 60-cycle Edison systems presents a second case of parallel direct-current operation with independent alternating-current power supplies. A fundamental requirement of safe operation of the paralleled converters has proven to be the maintenance of the correct commutating pole strength under normal and emergency conditions of operation.

For a number of years past, booster rotary converters have been designed and utilized in commercial systems having commutation control mechanism meeting all of the requirements of direct converter operation, but being deficient on inverted converter operation, as when the voltage suddenly drops in one of the independent alternating-current supply systems. It is my belief that the difficulty with prior control systems has been either that the auxiliary commutating field has been merely reduced to zero upon inverted converter operation, or, if the auxiliary commutating field has been reversed at all prior to my present invention, this feature has not been utilized in the combinations necessary to produce correct commutation control for booster rotary converters, or the action has been entirely too slow to prevent the burning off of the brushes or commutator during emergency conditions when the converter is suddenly operated in inverted condition.

The principal object of my invention, therefore, is to devise a method of, and means for, properly reversing the auxiliary commutating field upon the occurrence of inverted converter operation.

Another object of my invention is to provide a double-acting torque motor which is capable of moving a reversing rheostat in either direction from its neutral position.

A more specific object of my invention is to provide means for controlling an auxiliary shunt commutating winding on a rotary converter in accordance with the setting of the field rheostat of a booster associated therewith, and, at the same time, correcting the exciting current of the auxiliary commutating winding in accordance with the direction and magnitude of the load current of the converter.

With the above and other objects in view, my invention consists in the methods and apparatus described in the following specification, particularly pointed out in the subjoined claims, and illustrated in the accompanying drawing.

In general, my invention is an improvement upon the system and apparatus described in an article entitled "Synchronous booster rotary converters", by J. L. McK. Yardley, appearing on page 267 et seq, of the Electric Journal for 1914, and also described and claimed in Patent No. 1,392,076, granted September 27, 1921, to F. D. Newbury and H. D. James, and assigned to the Westinghouse Electric and Manufacturing Company. In order to avoid unnecessary repetition, in the present application, of what is already known, a general reference is hereby made to the above entitled article and patent for a further understanding of the prior-art apparatus and practice upon which my present improvements are based.

The three figures of the accompanying drawing are diagrammatic views of circuits and apparatus embodying my invention in three different forms, the preferred form being indicated in Fig. 2.

In Figure 1 is shown a booster rotary converter system comprising a three-wire direct-current network 4, having a positive conductor 5, a negative conductor 6 and a neutral conductor 7, supplied from a rotary converter 8, which is, in turn, energized through a mechanically and electrically connected booster 9, from an alternating current supply system 10. The converter 8 is provided with main poles 11 and interpoles 12, the main poles 11 being energized by a main shunt winding 13 associated with a shunt field rheostat 14, and the interpoles 12 being energized, in part, by a series commutating winding 15 which is adjusted to compensate for the armature reaction with the booster 9 unexcited and, in part, by an auxiliary commutating winding 16, which is energized by apparatus to be hereinafter described.

The booster 9 is provided with a main exciting winding 17 which is energized from a reversing rheostat 18 illustrated as being connected across the positive and negative conductors 5 and 6 of the direct-current system.

At any given load-current carried by the converter 8, it has been recognized, in times past, that the auxiliary commutating winding 16 should be excited by a current which varies in direction and magnitude in accordance with the booster voltage, the ratio between the auxiliary commutating current and the booster voltage preferably increasing as the booster is adjusted from maximum buck to maximum boost.

I have, therefore, shown, in Fig. 1, a rheostat 19, which is electrically connected in series with the auxiliary commutating winding 16, and which is mechanically connected to the field rheostat 18 of the booster by means of a common shaft 20, the resistor 19 being so adjusted that the resistance is gradually cut out as the booster excitation is increased in either direction from zero, and the steps of the resistors being so chosen that the ratio between the auxiliary commutating winding current and the booster voltage increases as the booster is adjusted from maximum buck to maximum boost. A suitable reversing switch 21 is also provided which should be operated whenever the handle of the booster regulating rheostat 18 is moved through its neutral position.

In order to provide a control system which shall meet the requirements of sudden inverted converter operation, I have provided a double-acting torque motor 22 comprising an armature member 23 mounted upon a shaft 24 and energized from the direct-current mains through a small adjusting resistor 25. The torque motor 22 is also provided with a field winding 26 which is connected across the series commutating winding 15 in order to be energized in accordance with the direct current supplied by the converter.

Mounted upon the shaft 24 of the torque motor is a movable arm 27 of a reversing rheostat 28 which is connected across the positive and negative conductors 5 and 6 of the direct-current mains. The torque motor 22 and rheostat 28 are biased toward the neutral position of the rheostat by means of a pair of oppositely-acting springs 29 mounted upon the shaft 24.

The circuit comprising the auxiliary commutating winding 16, the reversing switch 21 and the variable resistor 19 is serially connected, through a small adjusting resistor 30, between the movable arm 27 of the rheostat 28 and the neutral conductor 7 of the direct-current mains.

In Fig. 2 is shown the particular form of apparatus which has been developed and placed in successful service. In the modification shown in Fig. 2, the necessity for the reversing switch 21 is avoided by replacing the variable resistor 19 by a reversing resistor 31 which changes sign at the same time as does a booster field voltage derived from the rheostat 18, the other connections remaining the same as in Fig. 1. In Fig. 2, also, the springs 29 have been replaced, for purposes of illustration, by a biasing weight arm 32, to indicate the fact that my invention is not necessarily restricted to the employment of any particular form of biasing means.

In Fig. 3 is shown a somewhat modified construction comprising a rheostat 28' energized across the positive and negative conductors 5 and 6 and having its midpoint 33 and its movable arm 27' connected, respectively, to the terminals of a reversing rheostat 31' similar to the reversing rheostat 31 in Fig. 2. The rheostats 28' and 31' are mounted, respectively, on the shafts 24 and 20 of the torque motor 22 and the booster field rheostat 18. The reversing rheostat 31' is provided with two contact arms 34 which are connected, through a small regulating resistor 30', to the auxiliary commutating winding 16 of the converter.

The operation of my apparatus will be apparent from the foregoing description. In particular, it is noted that, when the direct-current in the series commutator winding 15 reverses, under conditions of inverted converter operation, the torque of the torque motor 22 is reversed and the switch arm 27 of the reversing rheostat 28 is quickly moved to the opposite side of its neutral point, whereby the voltage applied to the exciting winding 16 is reversed.

In the foregoing specification and in the appended claims I have used the expression "reversing rheostat" to designate a rheostat which applies a zero potential to the controlled circuit when the rheostat arm is in its central position, whereas it applies a gradually increasing positive or negative potential to the controlled circuit as the rheostat arm is moved from its central position, in one direction or the other. Thus, when the rheostat arm 27 of the reversing rheostat 28 is in its central position, its potential is the same as that of the neutral conductor 7 to which the other end of the controlled circuit is connected, said controlled circuit comprising, in the preferred embodiment shown in Fig. 2, the auxiliary commutating winding 16, the rheostat 31 and the resistor 30.

While I have described my invention with reference to three modifications, and in accordance with theories of operation which are, at present, believed to be proper, it is obvious that various substitutions and alterations may be adopted without departing from the broad principles of my invention. I desire, therefore, that the following claims shall be given the broadest construction consistent with their terminology when considered in the light of the prior art.

I claim as my invention:—

1. The combination with a synchronous booster rotary converter of the interpole type provided with a series-type commutating field winding designed to produce the proper commutating field under conditions of zero buck or boost and further provided with an auxiliary commutating field winding, of means for exciting said last-mentioned winding, in direction and in magnitude, in accordance with the excitation of the booster machine, means for further regulating the excitation of said auxiliary field winding in accordance with the direction and magnitude of the load current of the converter, said last-mentioned means comprising a reversing rheostat in circuit with said auxiliary field winding, means for biasing said reversing rheostat to neutral position, and a variable-torque means responsive to the direction and magnitude of said load current for actuating said reversing rheostat in either direction from its neutral position.

2. The combination with a rotary converter provided with cross-field windings, of a booster electrically associated therewith and provided with field windings, means for supplying a component of excitation to said cross-field windings in accordance with the direct current of the converter, auxiliary means for adjusting both the strength and direction of the excitation of said booster field windings and for simultaneously and similarly supplying a component of excitation to said cross-field windings, and quick-acting means responsive to both the direction and the magnitude of the load current of the converter for supplying a variable, reversible electro-motive force in series with said cross-field windings and with their associated auxiliary means.

3. The combination with a rotary converter provided with cross-field windings, of a booster electrically associated therewith and provided with field windings, means for supplying a component of excitation to said cross-field windings in accordance with the direct current of the converter, auxiliary means for adjusting both the strength and direction of the excitation of said booster field windings and for simultaneously and similarly supplying a component of excitation to said cross-field windings, torque-indicating means responsive to the product of the boosted voltage and the load current of said converter, and means responsive to said torque indicating means for supplying a variable, reversible electromotive force in series with said cross-field windings and with their associated auxiliary means.

4. The combination with a rotary converter provided with cross-field windings, of a booster electrically associated therewith and provided with field windings, main means for exciting said cross-field windings in accordance with the load current of the converter, auxiliary means for adjusting both the strength and direction of the excitation of said booster field windings and for simultaneously supplying a component of excitation to said cross-field windings, said auxiliary means operating in such manner that said component of excitation opposes said main cross-field excitation during boosting conditions and assists the same during bucking conditions, and operating also in such manner that the ratio between said component of excitation and said booster field excitation increases as said auxiliary means is adjusted from maximum buck to maximum boost, and quick-acting electro-responsive means for reversing the voltage applied to said cross-field windings during inverted operation of the converter.

5. The combination with a rotary converter provided with cross-field windings, of a booster electrically associated therewith and provided with field windings, means for supplying a component of excitation to said cross-field windings in accordance with the direct current of the converter, auxiliary means for adjusting both the strength and direction of the excitation of said booster field windings and for simultaneously and similarly supplying a component of excitation to said cross-field windings, and quick-acting electro-responsive means for reversing the voltage applied to said cross-field windings through their associated auxiliary means during inverted operation of the converter.

6. The method of improving the commutation of a synchronous booster rotary converter of the class described, which consists in maintaining a commutating field having a component proportional to the load current of the converter, maintaining an additional component of commutating field which varies in direction and in magnitude in accordance with the adjustments of the voltage of the booster, and effecting a reversal of said commutating field upon inverted operation of the converter.

7. The method of improving the commutation of a synchronous booster rotary converter of the class described, which consists in maintaining a commutating field having a component proportional to the load current of the converter, maintaining an additional component of commutating field which varies in direction and in magnitude in accordance with the adjustments to the voltage of the booster, causing the ratio between said last-mentioned component and said booster voltage to increase as said booster is adjusted from maximum buck to maximum boost and effecting a reversal of said commutating field upon inverted operation of the converter.

8. The method of improving the commutation of a synchronous booster rotary converter, which consists in maintaining a commutating field having a component which varies in direction and magnitude in accordance with the adjustments of the voltage of the booster, and varying said component in direction and magnitude in accordance with the load current of said converter.

9. The method of improving the commutation of a synchronous booster rotary converter, which consists in maintaining a commutating field having a component which varies in direction and magnitude in accordance with the adjustments of the voltage of the booster, causing the ratio between said component and said booster voltage to increase as said booster is adjusted from maximum buck to maximum boost, and varying said component in direction and magnitude in accordance with the load current of said converter.

10. The combination with a rotary converter, of an alternating-current booster electrically and mechanically associated therewith, means for compensating for variations in the armature reaction under the brushes of the converter occasioned by the booster, and additional means for reversing the effect of said first-mentioned means upon inverted operation of said converter.

11. The combination with a plurality of dynamo-electric machines mechanically coupled and electrically connected in series circuit relation, of means operatively associated with both machines for assisting in regulating the voltage and securing good commutating conditions on one of said machines, and additional means responsive to the magnitude and the direction of the electrical power supplied to or by said last-mentioned machine for varying the corrective effect of said first-mentioned means on said commutating conditions.

12. A direct-current machine having a shunt commutating field winding, a reversing rheostat in circuit with said winding, means for biasing said rheostat to neutral position, and a variable torque means responsive to both the direction and magnitude of the load current for actuating said reversing rheostat in either direction from its neutral position.

13. A direct-current machine having a shunt commutating field winding, a reversing rheostat in circuit with said winding, means for biasing said rheostat to neutral position, and a variable torque means responsive to both the direction and magnitude of the product of the voltage and current for actuating said reversing rheostat in either direction from its neutral position.

14. The combination with a three-wire, direct-current system comprising positive, negative and neutral conductors, and a direct-current machine associated therewith and having an exciting field winding, a main series commutating winding and an auxiliary commutating winding, of a direct-current torque motor having field and armature windings one of which is connected across said series commutating winding and the other of which is connected across said positive and negative conductors, a rheostat connected across said positive and negative conductors, said rheostat having a relatively movable contact arm, a mechanical connection between said rheostat and said torque motor, biasing means tending to maintain said contact arm in mid-position, an auxiliary variable resistor, and a circuit including said auxiliary commutating winding and said auxiliary variable resistor, said circuit being serially connected between said contact arm and said neutral conductor.

15. In combination, a three-wire, direct-current system comprising positive, negative and neutral conductors, a rotary converter associated therewith and having an exciting field winding, a main series commutating winding and an auxiliary commutating winding, a booster mechanically and electrically connected to said rotary converter and having an exciting field winding, a direct-current torque motor having field and armature windings one of which is connected across said series commutating winding and the other of which is connected across said positive and negative conductors, a rheostat connected across said positive and negative conductors, said rheostat having a relatively movable contact arm, a mechanical connection between said rheostat and said torque motor, biasing means tending to maintain said contact arm in mid-position, an auxiliary reversing rheostat, means for variably exciting said booster field winding, means for adjusting said auxiliary rheostat in accordance with the booster adjustment, and a circuit including said auxiliary commutating winding and said auxiliary reversing rheostat, said circuit being serially connected between said contact arm and said neutral conductor.

16. In combination, a direct-current circuit comprising positive and negative conductors, a rotary converter associated therewith and having an exciting field winding, a main series commutating winding and an auxiliary commutating winding, a booster mechanically and electrically connected to said rotary converter and having an exciting field winding, a direct-current torque motor having field and armature windings one of which is connected across said series commutating winding and the other of which is energized from said positive and negative conductors, a rheostat connected across said positive and negative conductors, said rheostat having a relatively movable contact arm, a mechanical connection between said rheostat and said torque motor, biasing means tending to maintain said contact arm in midposition, an auxiliary reversing rheostat, means for variably exciting said booster field winding, means for adjusting said auxiliary rheostat in accordance with the booster adjustment, means for reversibly energizing said reversing rheostat from said movable arm and a point of substantially zero potential relatively to said positive and negative conductors, and means for reversibly energizing said auxiliary commutating winding from said reversing rheostat.

In testimony whereof, I have hereunto subscribed my name this 6th day of March 1923.

FLOYD T. HAGUE.